United States Patent
Lee et al.

(10) Patent No.: US 9,414,362 B2
(45) Date of Patent: *Aug. 9, 2016

(54) FEEDBACK METHOD AND APPARATUS FOR COOPERATIVE COMMUNICATION SYSTEM

(71) Applicant: Samsung Electronics Co., Ltd., Gyeonggi-do (KR)

(72) Inventors: Hyojin Lee, Seoul (KR); Younsun Kim, Gyeonggi-do (KR); Kiil Kim, Gyeonggi-do (KR); Youngbum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,434

(22) Filed: Sep. 22, 2015

(65) Prior Publication Data

US 2016/0014756 A1  Jan. 14, 2016

Related U.S. Application Data

(63) Continuation of application No. 14/309,456, filed on Jun. 19, 2014, now Pat. No. 9,210,694, which is a continuation of application No. 13/525,958, filed on Jun. 18, 2012, now Pat. No. 9,125,189.

(30) Foreign Application Priority Data

Jun. 17, 2011 (KR) .................. 10-2011-0059289

(51) Int. Cl.
*H04W 4/00* (2009.01)
*H04W 72/04* (2009.01)
(Continued)

(52) U.S. Cl.
CPC .......... *H04W 72/0406* (2013.01); *H04B 7/024* (2013.01); *H04B 17/24* (2015.01);
(Continued)

(58) Field of Classification Search
CPC .... H04W 72/082; H04W 72/06; H04W 16/14
USPC .......................................... 370/252; 455/509
See application file for complete search history.

(56) References Cited

U.S. PATENT DOCUMENTS 9,125,189 B2 * 9/2015 Lee ................. H04B 7/024
9,210,694 B2 * 12/2015 Lee ................. H04B 7/024
(Continued)

OTHER PUBLICATIONS

Motorola Mobility, "Further Phase-1 Evaluations of Joint Transmission and DCS", 3GPP TSG RAN1 #65, R1-111600, May 9-13, 2011.
Mamoru Sawahashi et al., "Coordinated Multipoint Transmission/Reception Techniques for LTE-Advanced", IEEE Wireless Communications, Jun. 2010.
Nokia Siemens Networks, Nokia, "CoMP Phase1 Performance Evaluation Summary", 3GPP TSG-RAN WG1 Meeting #65, R1-111733, May 9-14, 2011.
European Search Report dated Oct. 30, 2014 issued in counterpart application No. 14174737.8-1852.
New Postcom, "Design of PDSCH Muting for CSI-RS in LTE-Advanced", R1-105223, 3GPP TSG RAN WG1 Meeting #62bis, Oct. 11-15, 2010.
European Search Report dated Dec. 22, 2014 issued in counterpart application No. 12799881.3-1852.
(Continued)

*Primary Examiner* — Mark Rinehart
*Assistant Examiner* — Matthew Hopkins
(74) *Attorney, Agent, or Firm* — The Farrell Law Firm, P.C.

(57) ABSTRACT

Methods and apparatuses are provided for transmitting channel information, by a User Equipment (UE). Information for at least one first type Channel Status Information Reference Signal (CSI-RS) and information for at least one second type CSI-RS from an eNB, are identified. First channel information is generated based on a first set of a first type CSI-RS and a second type CSI-RS. Second channel information is generated based on a second set of a first type CSI-RS and a second type CSI-RS. The first channel information is reported by Physical Uplink Control CHannel (PUCCH)-based periodic channel information feedback. The second channel information is reported by the PUCCH-based periodic channel information feedback.

20 Claims, 9 Drawing Sheets

(51) Int. Cl.

| | | |
|---|---|---|
| *H04B 7/02* | (2006.01) | |
| *H04W 48/20* | (2009.01) | |
| *H04L 5/00* | (2006.01) | |
| *H04B 17/24* | (2015.01) | |
| *H04B 17/309* | (2015.01) | |
| *H04B 17/336* | (2015.01) | |
| *H04B 17/382* | (2015.01) | |
| *H04W 72/08* | (2009.01) | |
| *H04W 28/04* | (2009.01) | |

(52) U.S. Cl.
CPC ........... *H04B 17/309* (2015.01); *H04B 17/336* (2015.01); *H04B 17/382* (2015.01); *H04L 5/0035* (2013.01); *H04L 5/0048* (2013.01); *H04W 48/20* (2013.01); *H04W 28/048* (2013.01); *H04W 72/082* (2013.01); *H04W 72/085* (2013.01)

(56) References Cited

U.S. PATENT DOCUMENTS

| | | | |
|---|---|---|---|
| 2009/0203383 A1* | 8/2009 | Shen | H04L 5/0091 455/450 |
| 2011/0141926 A1 | 6/2011 | Damnjanovic et al. | |
| 2012/0329502 A1* | 12/2012 | Frederiksen | H04L 1/0026 455/509 |

OTHER PUBLICATIONS

NTT DOCOMO, "System Performance of JP-CoMP in Homogeneous Networks with RRHs", R1-111637, 3GPP Tsg Ran WG1 Meeting #65, May 9-13, 20.

Motorola Mobility, "Further Phase-1 Evaluatons of Joint Transmission and DCS Schemes", R1-111819, 3GPP TSG RAN1 #65, May 9-13, 2011.

\* cited by examiner (PRIOR ART)

☐ PDSCH

▥ DM-RS for ports 7, 8, 11, 13

▤ DM-RS for ports 9, 10, 12, 14

▨ CRS

▦ Control Channel (PRIOR ART)

FEEDBACK METHOD AND APPARATUS FOR COOPERATIVE COMMUNICATION SYSTEM

PRIORITY

This application is a Continuation Application of U.S. patent application Ser. No. 14/309,456, which was filed in the U.S. Patent and Trademark Office (USPTO) on Jun. 19, 2014, which is a Continuation Application of U.S. patent application Ser. No. 13/525,958, which was filed in the USPTO on Jun. 18, 2012, now U.S. Pat. No. 9,125,189, issued on Sep. 1, 2015, which claims priority under 35 U.S.C. §119(a) to Korean Patent Application No. 10-2011-0059289, which was filed in the Korean Intellectual Property Office on Jun. 17, 2011, the disclosures of which are incorporated herein by reference.

BACKGROUND OF THE INVENTION

1. Field of the Invention

The present invention generally relates to a method and apparatus for generating feedback signal in a cellular mobile communication system including a plurality of base stations and, more particularly, to a feedback method and apparatus for Cooperative Multi-Point (CoMP) in which multiple base stations cooperate with each other for downlink transmission to a terminal.

2. Description of the Related Art

Mobile communication systems have evolved into high-speed, high-quality wireless packet data communication systems to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support high-speed, high-quality wireless packet data communication services.

Particularly, the LTE-A communication standard has been developed to support high speed packet data transmission and to maximize the throughput of the radio communication system with various radio access technologies. LTE-A is the evolved version of LTE to improve data transmission capability.

The existing $3^{rd}$ generation wireless packet data communication systems (including HSDPA, HSUPA and HRPD) adopt Adaptive Modulation and Coding (AMC) and Channel-Sensitive Scheduling techniques to improve transmission efficiency.

In the wireless packet data communication system adopting AMC, the transmitter is capable of adjusting the data transmission amount based on channel conditions. That is, the transmitter decreases the data transmission amount for bad channel conditions so as to fix the received signal error probability at a certain level and increases the data transmission amount for good channel conditions so as to efficiently transmit a large amount of information while maintaining the received signal error probability at an intended level.

In the wireless packet data communication system adopting channel sensitive scheduling, the transmitter serves the user having a good channel condition first among a plurality of users so as to increase the system capacity as compared to allocating a channel to just one user. Such increase of system capacity is referred to as multi-user diversity gain.

When using AMC along with a Multiple Input Multiple Output (MIMO) transmission scheme, it may be necessary to take into consideration the number of spatial layers and ranks for transmitting signals. In this case, the transmitter determines the optimal data rate in consideration of the number of layers for use in MIMO transmission.

In general, OFDMA is expected to provide superior system throughput as compared to CDMA. One of the main factors that allows OFDMA to increase system throughput is the frequency domain scheduling capability. As channel sensitive scheduling increases system capacity using time-varying channel characteristics, OFDMA can be used to obtain more capacity gain using frequency-varying channel characteristics. Recently, research is being conducted to replace Code Division Multiple Access (CDMA) used in the legacy $2^{nd}$ and $3^{rd}$ mobile communication systems with Orthogonal Frequency Division Multiple Access (OFDMA) for the next generation mobile communication system. 3GPP and 3GPP2 are in the middle of the standardization of an OFDMA-based evolved system.

FIG. 1 is a diagram illustrating a conventional cellular mobile communication system in which the transmit/receive antenna is arranged at the center of the cells.

Referring to FIG. 1, in the cellular mobile communication system including a plurality of cells, a User Equipment (UE) receives mobile communication service from a cell selected for a semi-static duration with the above described techniques. Suppose that the cellular mobile communication system includes three cells 100, 110, and 120. Also, suppose the cell 100 serves the UEs 101 and 102 within its service area, the cell 110 serves the UE 111, and the cell 120 serves the UE 121.

The UE 102 served by the cell 100 is located far from the antenna 130 as compared to the UE 101. In this case, the UE 102 experiences significant interference from the central antenna of the neighbor cell 120 so as to be served by the UE 100 at a relatively low data rate.

When the cells 100, 110, and 120 provide the mobile communication service independently, they transmit Reference Signals (RSs) for downlink channel estimation at the recipient. Particularly in the 3GPP LTE-A system, the UE measures the channel condition between the eNB and itself using a Channel Status Information Reference Signal (CSI-RS) transmitted by the eNB.

FIG. 2 is a diagram illustrating a resource block including an CSI-RS transmitted from an eNB to a UE in a conventional LTE-A system.

Referring to FIG. 2, two CSI-RS antenna port signals are mapped to each of the positions 200 to 219. That is, the eNB transmits two CSI-RSs for downlink measurement to the UE at the position 200. When the cellular mobile communication system includes a plurality of cells as depicted in FIG. 1, the CSI-RS is transmitted in different positions corresponding to the respective cells. For example, the CSI-RS is transmitted at the position 200 for the cell 100, the position 205 for the cell 110, and the position 210 for the cell 120. The reason why the cells are allocated resources at different positions for CSI-RS transmission is to prevent the CSI-RSs of different cells from interfering among each other.

The permutation of CSI-RSs transmitted at the positions of the CSI-RS antenna ports are defined by Equation (1).

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

-continued $$m = 0, 1, \ldots, N_{RB}^{max,DL} - 1$$

In Equation (1), c denotes the pseudo-random permutation, and the initial value of the permutation generator is defined by Equation (2).

$$c_{init}=2^{10} \cdot (7 \cdot (n_s+1)+l+1) \cdot (2 \cdot N_{ID}^{cell}+1)+2 \cdot N_{ID}^{cell}+N_{CP} \quad (2)$$

In Equation (2), l denotes an OFDM symbol order in a slot, and $N_{CP}$ denotes the length of a cyclic prefix (CP) used in the cell and is set to 0 or 1.

In the cellular mobile communication system depicted in FIG. 1, the UE located at the cell edge is limited in data rate due to significant interference from neighbor cells. This means that the data rate of the UE is influenced significantly by its location within the cell in the cellular mobile communication system depicted in FIG. 1. That is, although the conventional cellular mobile communication system may serve the UE located near the center of the cell at a high data rate, it is impossible to serve the UE located far from the center of the cell at a higher data rate.

SUMMARY OF THE INVENTION

The present invention has been made in an effort to solve the above-described problems and it is an aspect of the present invention to provide a feedback method and apparatus that is capable of facilitating CoMP transmission in an LTE-A system.

In accordance with an aspect of the present invention, a method is provided for transmitting channel information, by a UE. Information for at least one first type CSI-RS and information for at least one second type CSI-RS from an eNB are identified. First channel information is generated based on a first set of a first type CSI-RS and a second type CSI-RS. Second channel information is generated based on a second set of a first type CSI-RS and a second type CSI-RS. The first channel information is reported by Physical Uplink Control CHannel (PUCCH)-based periodic channel information feedback. The second channel information is reported by the PUCCH-based periodic channel information feedback.

In accordance with another aspect of the present invention, a method is provided for receiving channel information, by a eNB. Information for at least one first type CSI-RS and information for at least one second type CSI-RS is transmitted to a UE. First channel information is received by PUCCH-based periodic channel information feedback. Second channel information is received by the PUCCH-based periodic channel information feedback. The first channel information is generated based on a first set of a first type CSI-RS and a second type CSI-RS. The second channel information is generated based on a second set of a first type CSI-RS and a second type CSI-RS.

In accordance with another aspect of the present invention, a user equipment is provided for transmitting channel information. The user equipment includes a communication unit configured to transmit and receive signals. The user equipment also includes a control unit configured to control identifying information for at least one first type CSI-RS and information for at least one second type CSI-RS from an eNB. The control unit is also configured to control generating first channel information based on a first set of a first type CSI-RS and a second type CSI-RS. The control unit is also configured to control generating second channel information based on a second set of a first type CSI-RS and a second type CSI-RS.

The control unit is also configured to control reporting the first channel information by PUCCH-based periodic channel information feedback. The control unit is also configured to control reporting the second channel information by the PUCCH-based periodic channel information feedback.

In accordance with still another aspect of the present invention, an eNB is provided for receiving channel information. The eNB includes a communication unit configured to transmit and receive signals. The eNB also includes a control unit configured to control transmitting information for at least one first type CSI-RS and information for at least one second type CSI-RS to a UE. The control unit is also configured to control receiving first channel information by PUCCH-based periodic channel information feedback. The control unit is also configured to control receiving second channel information by the PUCCH-based periodic channel information feedback. The first channel information is generated based on a first set of a first type CSI-RS and a second type CSI-RS. The second channel information is generated based on a second set of a first type CSI-RS and a second type CSI-RS.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Various embodiments of the present invention are described with reference to the accompanying drawings in detail. Detailed description of well-known functions and structures incorporated herein may be omitted to avoid obscuring the subject matter of the present invention.

Although a detailed description of the present invention is given herein with reference to the OFDM-based radio communication system, particularly 3GPP E-UTRA standard system, it will be understood by those skilled in the art that the present invention can be applied to other communication systems having a similar technical background and channel format, with a slight modification, without departing from the spirit and scope of the present invention.

The cellular mobile communication system is composed of a plurality of cells deployed within a restricted area. A cell is defined as a geographic area where UEs are served by an eNB apparatus. A UE is served by a cell, which is selected semi-statically. Such a system is referred to as a non-CoMP system hereinafter. In the non-CoMP system, the UE is assigned a data rate that varies significantly according to its location within the cell. A UE located near the center of the cell is assigned a high data rate while a UE located far from the center of the cell is assigned a low data rate.

A CoMP system is the opposite of the non-CoMP one. The CoMP system is a system in which multiple cells cooperate for data transmission to the UE located at the cell edge. The CoMP system is superior to the non-CoMP system in quality of mobile communication service. The present invention provides a feedback method and apparatus operating based on Dynamic cell Selection (DS) and Dynamic cell Blanking (DB) techniques that are characterized by relatively simple operation and improved performance. DS is a method for the UE to measure the channel condition per cell and select a cell having an optimized channel. DB is a method for one or more cells that are potentially producing interference to mute data transmission for predetermined time duration. The present invention modifies the feedback structure so as to apply the DS or DB technique to the LTE-A system to solve the aforementioned problems.

Figure 1:
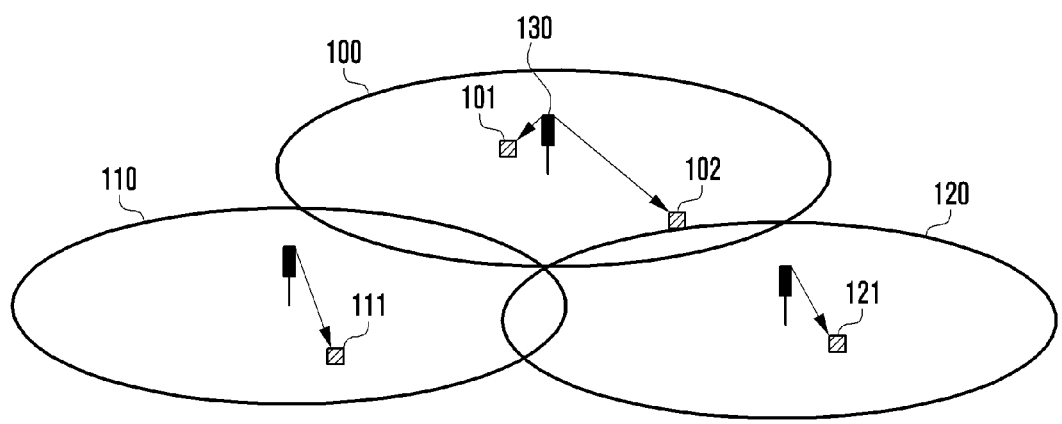
FIG. 1 is a diagram illustrating a conventional cellular mobile communication system in which a transmit/receive antenna is arranged at a center of cells.
Figure 2:
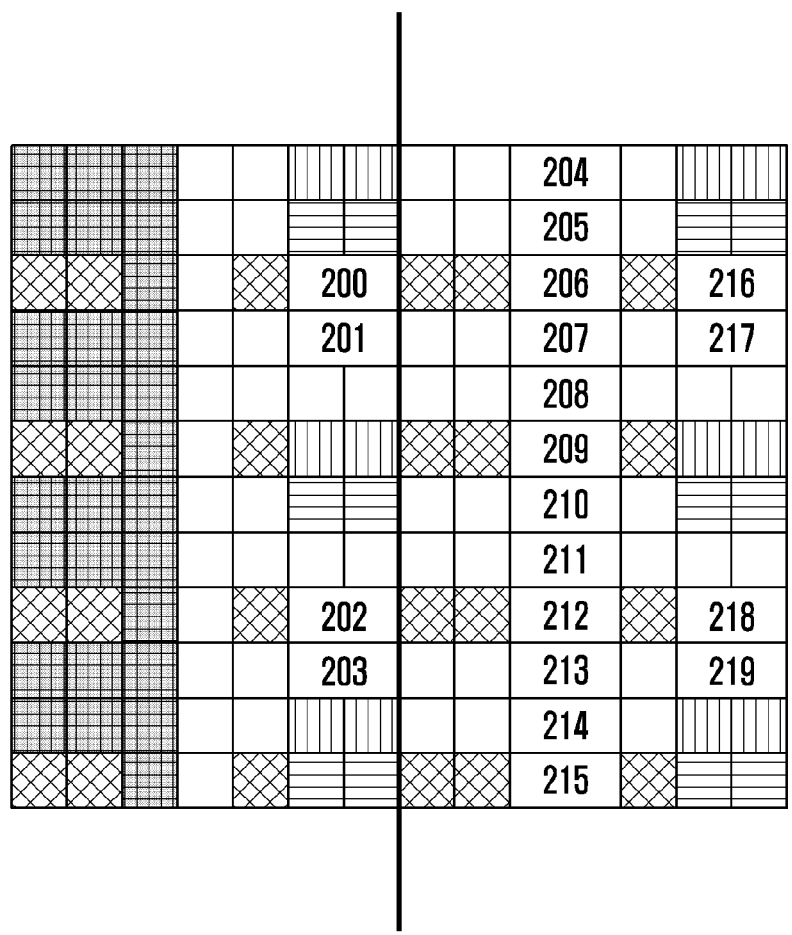
FIG. 2 is a diagram illustrating a resource block including a CSI-RS transmitted from an eNB to a UE in a conventional LTE-A system.
Figure 3:
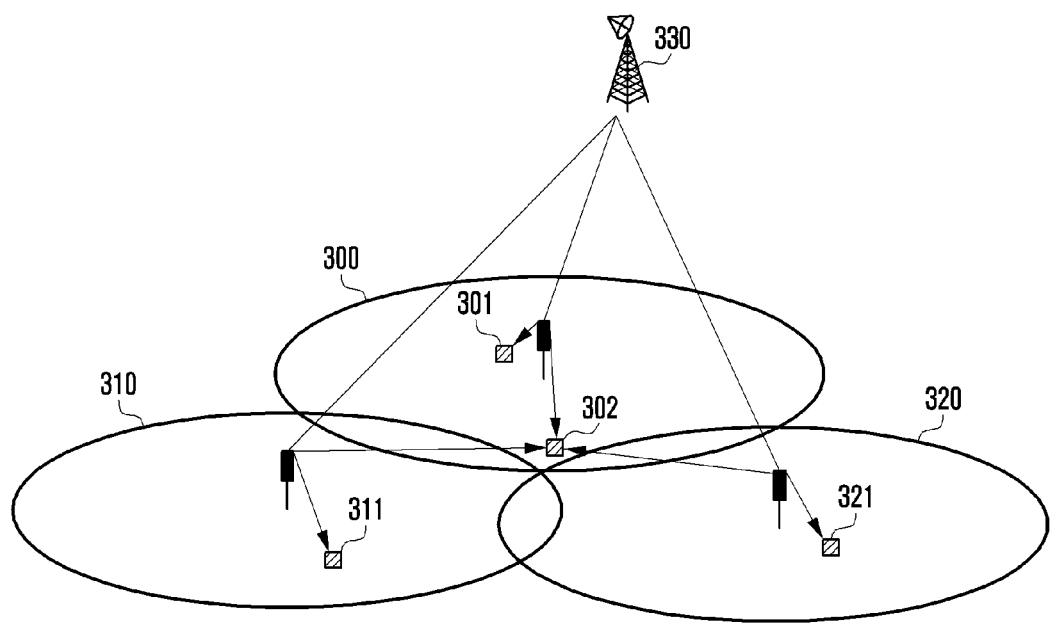
FIG. 3 is a diagram illustrating a cellular mobile communication system according to an embodiment of the present invention.

FIG. 3 is a diagram illustrating a cellular mobile communication system according to an embodiment of the present invention. Specifically, FIG. 3 is directed to cellular mobile communication systems composed of three cells. In an embodiment of the present invention, the term "cell" means a service area centered around a specific transmission point, which may be a Remote Radio Head (RRH) sharing the cell ID with the macro eNB within the macro cell or a macro or pico cell having a unique cell ID.

A central controller is an apparatus that is capable of communicating data with UEs and processing the data. When the transmission point is the RRH sharing a cell ID with the macro eNB, the macro eNB can be referred to as the central controller. When the transmission point is the macro or pico cell having a unique cell ID, an apparatus managing the cells integrally can be referred to as the central controller.

Referring to FIG. 3, the cellular mobile communication system includes at least one cell 300, 310 and 320; UEs 301, 311, and 321 which receive data from the nearest cell; and a UE 302 that receives data in CoMP transmission from the cells 300, 310, and 320. The UEs which receive data from the nearest cell 301, 311, and 321 perform channel estimation based on the Channel Status Information Reference Signal (CSI-RS) for the cell in which the UEs are located and transmit the corresponding feedback to the central controller 330. However, the UE 302 which is served in CoMP transmission from the cells 300, 310, and 320 has to perform channel estimation for each of the three cells. In order for the UE 302 to perform channel estimation, the central controller 330 assigns three CSI-RSs corresponding to the cells participating in the CoMP transmission for the UE 302. A description is made of the CSI-RS allocation method with reference to FIG. 4.

Figure 4:
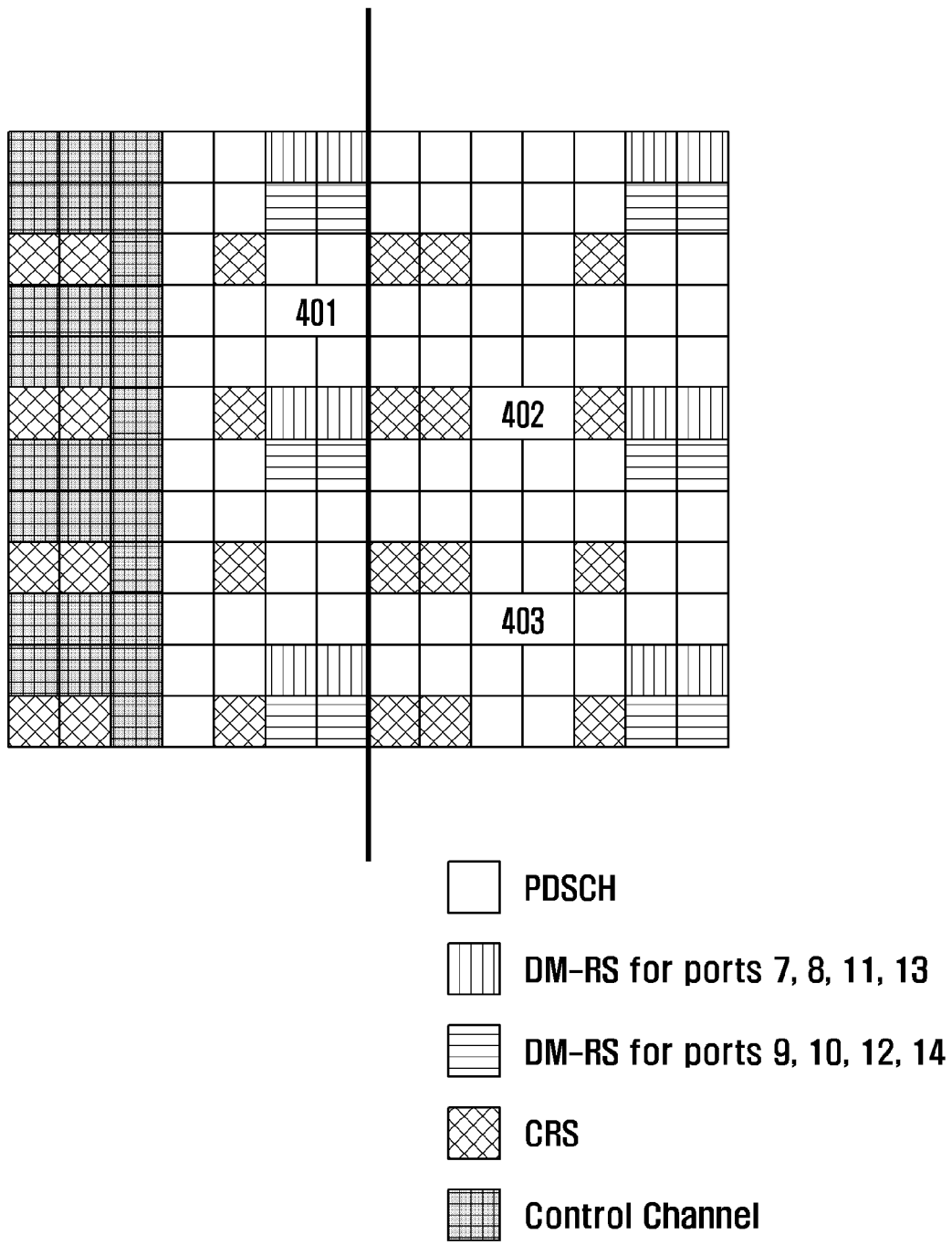
FIG. 4 is a diagram illustrating a resource block including a CSI-RS transmitted from an eNB to a UE according to an embodiment of the present invention.

FIG. 4 is a diagram illustrating a resource block including a CSI-RS transmitted from an eNB to a UE in the system according to an embodiment of the present invention.

Referring to FIG. 4, the central controller allocates resources 401, 402, and 403 for three CSI-RSs such that the UE receiving CoMP transmission is capable of estimating channels from the cells 300, 310, and 320. The resources are allocated to correspond to the CSI-RSs for channel estimations in the respective cells. Reference number 401 denotes the resource allocated to CSI-RS for channel estimation in the cell 300, reference number 402 denotes the resource allocated to CSI-RS for channel estimation in the cell 402, and reference number 403 denotes the resource allocated to CSI-RS for channel estimation in the cell 403. A set of cells having the resource allocated to at least one CSI-RS transmitted for channel estimation of the CoMP UE is referred to as a measurement set. Although the description is directed to where the central controller knows the cell IDs of all cells participating in the CoMP transmission, the present invention is not limited thereto. That is, the cells participating in the CoMP transmission share information on the cell IDs and positions of the resource allocated to the respective cells for cooperative transmission to a UE.

Figure 5:
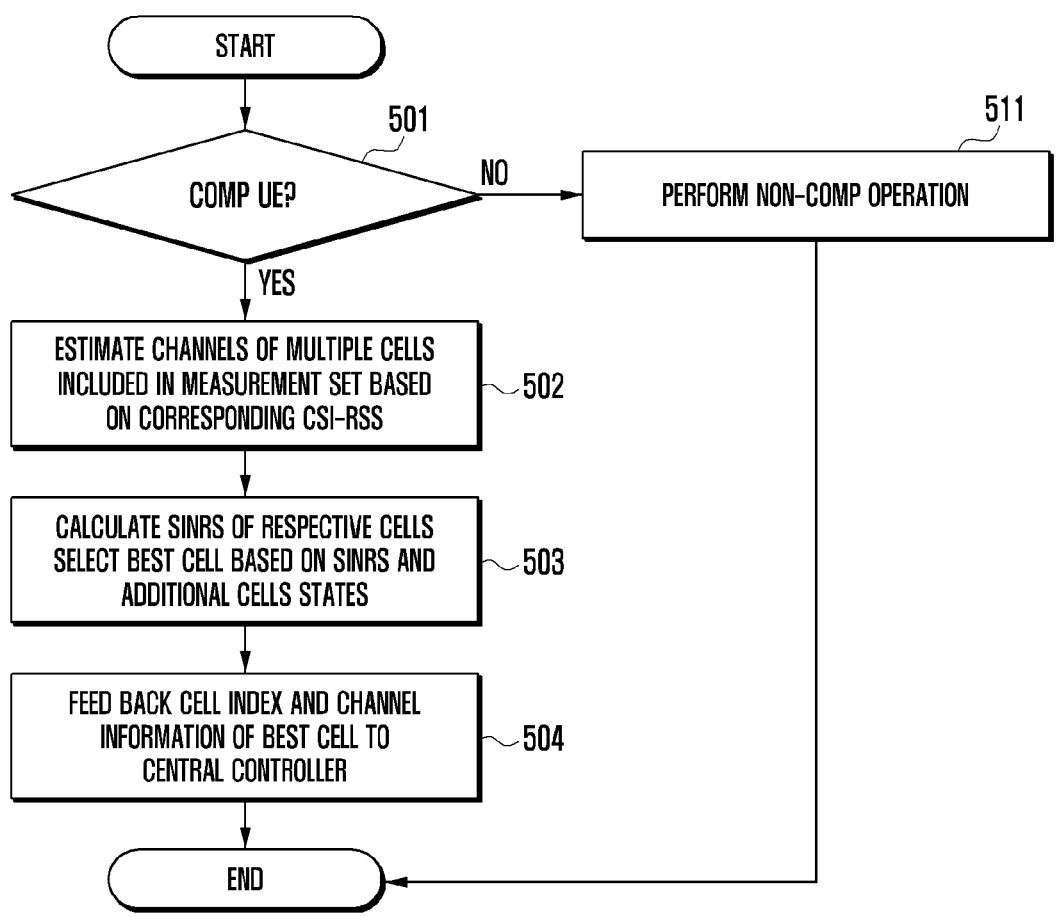
FIG. 5 is a flowchart illustrating a UE procedure for feedback in a DS-based cellular mobile communication system according to an embodiment of the present invention.

FIG. 5 is a flowchart illustrating a UE procedure for feedback in a DS-based cellular mobile communication system according to an embodiment of the present invention. DS is a technique in which the UE measures the channel status and selects the cell having the best channel.

Referring to FIG. 5, the UE operating in the DS mode determines at step 501 whether it is a CoMP UE. The CoMP UE can be determined based on the feedback mode requested by the central controller. That is, the central controller notifies the UE of the feedback mode in which the UE is to operate, in advance. The UE checks the feedback mode to determine whether it is a CoMP UE.

If it is determined that the UE is a CoMP UE, the UE estimates the channels of the cells participating in the CoMP transmission based on the CSI-RSs in the measurement set at step 502. Referring to FIGS. 3 and 4, the UE 302 estimates the channels of the cells 300, 310, and 320 based on the CSI-RSs 401, 402, and 403 respectively in the measurement set having the resources allocated by the central controller.

Afterward, the UE calculates signal-to-noise plus interference ratio (SINR) for the respective cells and selects a best cell in consideration of additional cell conditions at step 503. Here, the additional cell conditions may be a number of other UEs within a specific cell. Since it is impossible for the UE to check the number of other UEs directly, the central controller transmits cell status information including an offset value to the UE. The offset value can be expressed as SINR or a Modulation and Coding Scheme (MCS) value. In the case of using the offset value as SINR or MCS value, the best cell is selected as expressed by Equations (3) or (4).

$$i^* = \arg\max_i \lfloor \text{SINR}(R_i, \Sigma_{j \in M(i)} R_j) + \text{offset}_i^{SINR} \rfloor \quad (3)$$

$$i^* = \arg\max_i \lfloor \text{SINR}(R_i, \Sigma_{j \in M(i)} R_j) + f(\text{offset}_i^{MCS}) \rfloor \quad (4)$$

In Equations (3) and (4), SINR(A, B) denotes an SINR calculation function with input of a receive channel A for signal and another receive channel B for interference. The receive channel A is expressed as $R_i$ which denotes the receive channel of the signal transmitted by an $i^{th}$ cell. The receive channel B for interference is expressed as $\Sigma_{j \in M(i)} R_j$, and M denotes the measurement set. In Equation (4), $f$ denotes a function of the UE receiver for converting the MCS value to the SINR value. In case of setting the offset value as MCS, the characteristic of the UE receiver is reflected in the cell selection process so as to give an advantage as compared to the setting the offset value as SINR. Once the best cell has been selected at step 503, the UE feeds back the cell index of the selected cell and the related channel information to the central controller at a predetermined feedback period at step 504.

Returning to step 501, if it is determined that the UE is not a CoMP UE, the UE performs a non-CoMP operation at step 511. In the non-CoMP operation, the UE performs channel estimation for the cell transmitting data thereto and feeds back the channel status information to the central controller.

Figure 6:
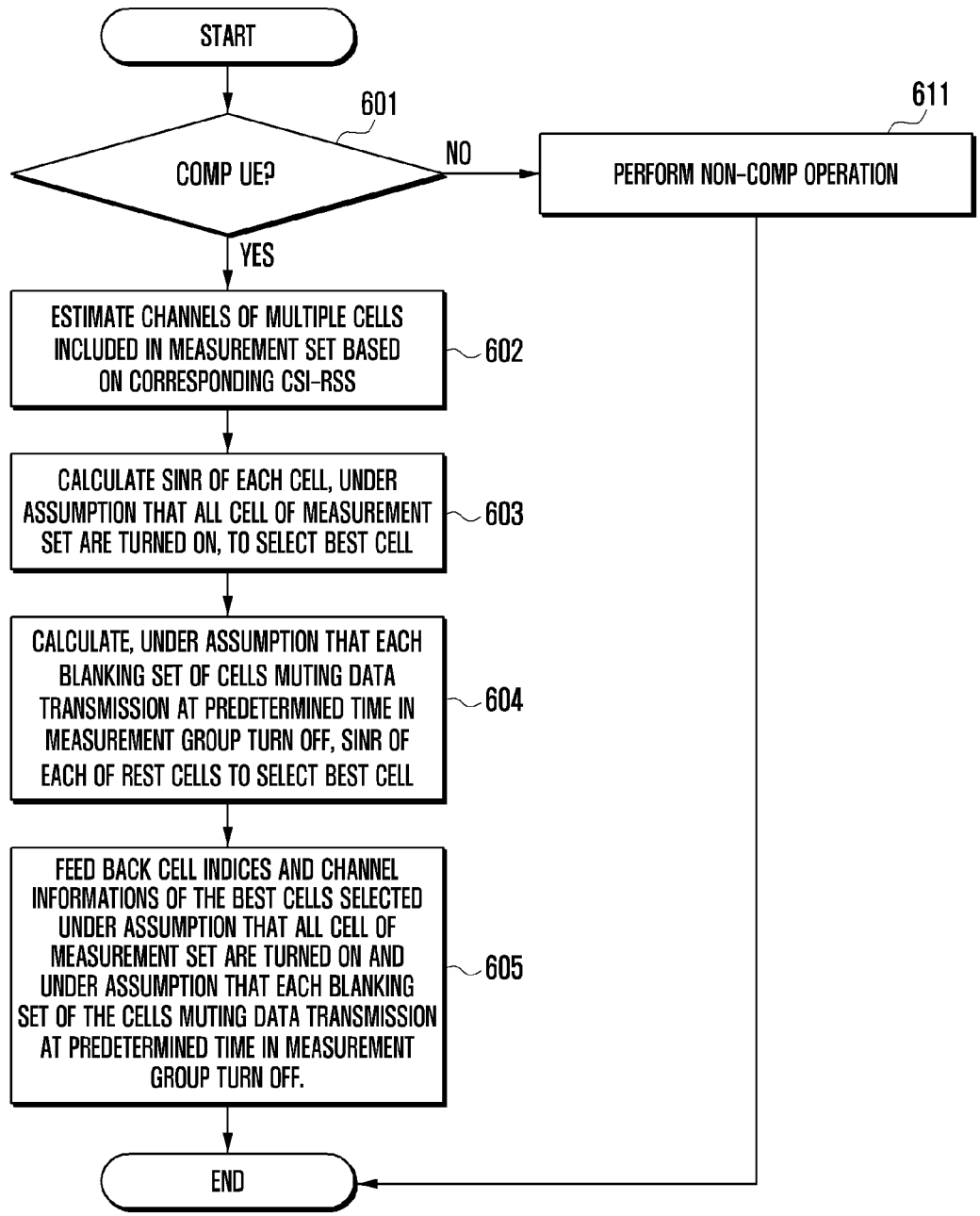
FIG. 6 is a flowchart illustrating a UE procedure for feedback in a DB-based cellular mobile communication system according to an embodiment of the present invention.

FIG. 6 is a flowchart illustrating a UE procedure for feedback in a DB-based cellular mobile communication system according to an embodiment of the present invention.

Referring to FIG. 6, the UE operating in the DB mode determines at step 601 whether it is a CoMP UE. The CoMP UE can be identified based on the feedback mode requested by the central controller. That is, the central controller notifies the UE of the feedback mode in which the UE is to operate, in advance. The UE checks the feedback mode to determine whether it is a CoMP UE.

If it is determined that the UE is a CoMP UE, the UE estimates channels of the cells participating in the CoMP transmission based on the CSI-RSs in the measurement set at step 602. Referring to FIGS. 3 and 4, the UE 302 estimates the channels of the cells 300, 310, and 320 based on the CSI-RSs 401, 402, and 403 respectively in the measurement set of the cells having the resources allocated by the central controller. Assuming that all cells in the measurement set are turned on, the UE calculates SINRs for the respective cells to select the best cell. At this time, the UE calculates SINR for use in the DS mode and selects the best cell in consideration of additional cell conditions. Here, the blanking set for the DB mode is determined by the central controller. Since the SINR-based cell selection method has been described with reference with FIG. 5, a detailed description thereof is omitted herein.

In the DB mode, one or more cells considered to produce potential interference to a certain cell mute data transmission for a predetermined time duration. Accordingly, the central controller has to determine the cells to be off based on the feedback from the UE. It is not necessary for the UE to acquire the information on the cells to be off. In order to accomplish this, the central controller notifies the UE of at least one blanking set.

Assuming that the measurement set is $\{1, 2, 3, 4, 5, 6\}$ and the UE receives the blanking sets $\{1, 2\}$ and $\{3, 4\}$, the UE is aware that the number of cells to perform measurement is 6 and the cells 1 and 2 or the cells 3 and 4 may turn off simultaneously. Here, the indices correspond to the respective CSI-RSs in the measurement set.

Under the assumption that the cells belonging to the blanking set notified by the central controller have turned off, the UE calculates SINR for the remaining cell. The UE selects the best cell in association with each blanking cell in consideration of an additional offset value. The UE can select the best cell in V' blanking set as expressed by Equations (5) and (6).

$$i^*_k = \arg \max_i [SINR(R_i, \Sigma_{j \in M \setminus \{blanking\_set\_k, i\}} R_j) + \text{off-set}_i^{SINR}] \quad (5)$$

$$i^*_k = \arg \max_i [SINR(R_i, \Sigma_{j \in M \setminus \{blanking\_set\_k, i\}} R_j) + f(\text{off-set}_i^{MCS})] \quad (6)$$

Once the best cell has been selected in each blanking set, the UE feeds back, to the central controller, the cell index of the best cell and channel information in the state that all selected cells are turned on and the cell indices of the best cells in the respective blanking sets and the related channel information.

Returning to step 601, if it is determined that the UE is not a CoMP UE, the UE performs a non-CoMP operation at step 611. In the non-CoMP operation, the UE performs channel estimation for the cell transmitting data thereto and feeds back the channel status information to the central controller.

There are two feedback schemes for the UE to transmit the feedback information for DB in the LTE-A system: periodic channel information feedback through Physical Uplink Control CHannel (PUCCH) and non-periodic channel information feedback through Physical Uplink Shared CHannel (PUSCH).

The UE can perform the feedback in a predetermined order of the cells in the state that all the cells are turned on through the PUCCH-based periodic channel information feedback. For example, it is possible to perform the first PUCCH feedback for the cells in the state that all of the cells are turned on, the second feedback for the first blanking set, and the third feedback for the second blanking set. Once the PUCCH feedback has been completed for all blanking sets, the feedback restarts in the state that all of the cells are turned on.

Like the PUCCH-based periodic channel information feedback, the UE can perform the feedback in a predetermined order of the cells in the PUCCH-based non-periodic channel information feedback, however, the present invention is not limited thereto. That is, the UE is capable of designating a certain blanking set for feedback through the PDCCH including a field indicating activation of non-periodic feedback. For example, if the non-periodic feedback activation is indicated in the control information transmitted through the PDCCH and if the second blanking set feedback is indicated, the UE performs the non-periodic feedback through the PUSCH. The feedback scheme indication can be made in such a way that feedback for more than one blanking set is indicated through the PDCCH. In detail, a triggering bit may be introduced as an indicator triggering feedback of a specific interference status such that the feedback is triggered in response to the indicator.

Figure 7:
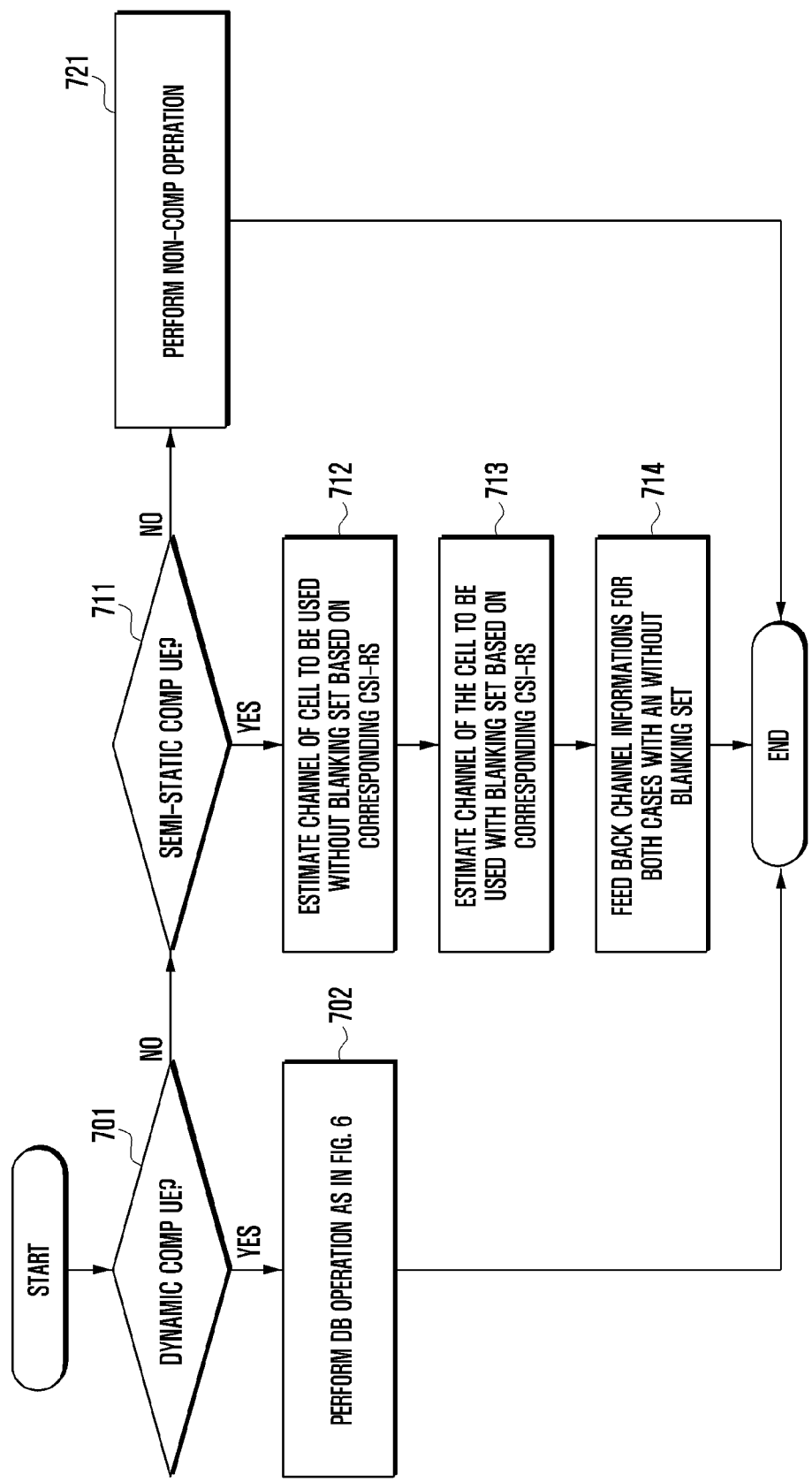
FIG. 7 is a flowchart illustrating a feedback method in a DB-based cellular mobile communication system adapted to the type of the UE according to an embodiment of the present invention.

FIG. 7 is a flowchart illustrating a feedback method in a DB-based cellular mobile communication system adapted to the type of the UE according to an embodiment of the present invention. UEs can be categorized into three types: dynamic CoMP UE, semi-static CoMP UE, and non-CoMP UE.

Referring to FIG. 7, the UE determines whether it is a dynamic CoMP UE. At this time, the CoMP UE can be determined based on the feedback mode requested by the central controller. That is, the central controller notifies the UE of the feedback mode in which the UE is to operate, in advance. The UE checks the feedback mode to determine whether it is a CoMP UE.

If it is determined at step 701 that the UE is a dynamic CoMP UE, the UE operates in DB mode at step 702. In brief, the UE estimates the channels of the respective cells based on the CSI-RSs in the measurement set. The UE calculates SINRs of the respective cells, under the assumption that all cells in the measurement set are turned on, to select the best cell. The UE also calculates, under the assumption that the cells belonging to the blanking set in the measurement set are turned off, the SINR of the remaining cells to select the best cell. Next, the UE collects the information on the channels of the best cells in the measurement set and in the blanking set and sends the channel information to the central controller.

If it is determined at step 701 that the UE is not a dynamic CoMP UE, the UE determines at step 711 whether it is a semi-static CoMP UE. This can be determined based on the feedback mode requested by the central controller. The semi-static CoMP UE is the UE receiving downlink data from a certain cell basically but, if the downlink transmission is muted in the cell, receives the downlink data from another cell. Accordingly, it is not necessary for the semi-static CoMP UE to feed back to the eNB the cell index of the best cell, but the channel information on the cell when blanking is not applied.

If it is determined at step 711 that the UE is a semi-static CoMP, the UE estimates the channel of the cell to be used without the existence of any blanking set based on the CSI-RS supposed to be used when there is no blanking set at step 712. Next, the UE estimates the channel of the cell to be used with the existence of the blanking set based on the CSI-RS supposed to be used when there is the existence of any blanking set at step 713. Finally, the UE feeds back the channel information obtained with and without existence of any blanking set to the central controller.

If it is determined at step 711 that the UE is not a semi-static CoMP, the UE performs a non-CoMP operation at step 721. In the non-CoMP operation, the UE performs channel estimation for the cell transmitting data thereto and feeds back the channel information to the central controller.

Figure 8:
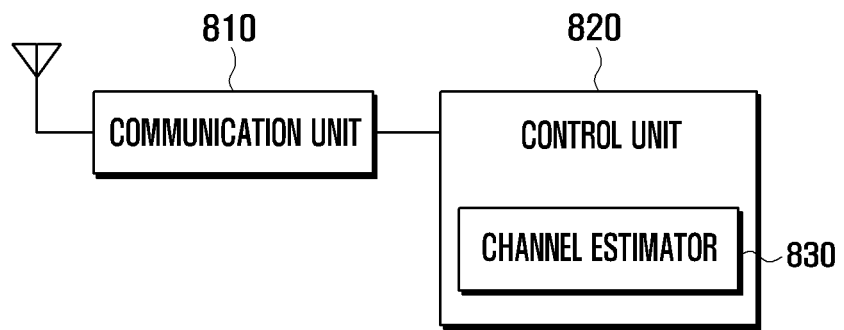
FIG. 8 is a schematic block diagram illustrating a UE according to an embodiment of the present invention.

FIG. 8 is a schematic block diagram illustrating a UE according to an embodiment of the present invention.

As shown in FIG. 8, the UE includes a communication unit 810 and a control unit 820.

The communication unit 810 is responsible for radio communication for transmitting/receiving data. Here, the communication unit 810 is capable of transmitting the channel information of the best cell under the control of the control unit 820.

The control unit 820 controls configurations and operations of the internal components of the UE. The control unit 820 selects the best cell according to the communication states with the respective cells and feeds back the channel information of the selected channel to the central controller. In order to accomplish this, the control unit includes a channel estimator 830.

The channel estimator 830 determines, based on the feedback mode notified by the central controller, whether the UE is the CoMP UE and estimates the channel based on the CSI-RSs received according to the determination result. The channel estimator 830 controls the communication unit 810 to select the best cell based on the estimated channels and transmits the channel information on the best cell to the central controller.

In more detail, if the UE is the CoMP UE, the channel estimator 830 estimates the channels of the respective cells based on the CSI-RSs in the measurement set. Next, the channel estimator 830 calculates SINRs of the cells in the measurement set to select the best cell, under the assumption that all of the cells are turned on. The channel estimator 830 also calculates, under the assumption that the cells of a certain blanking set in the measurement set are turned off, SINRs of the remaining cells to select the best cell in another blanking set. The channel estimator 830 feeds back the channel information about the best cell in the all-cell-turned-on state and the best cells in the blanking sets to the central controller.

Although the description is directed to the case where the UE includes the communication unit 810 and the control unit 820, the present invention is not limited thereto. That is, the UE may be provided with diverse components according to the features of the UE. For example, the UE may include a display unit for displaying the operation state of the UE, an input unit for receiving user input for executing a specific function, and a storage unit for storing data generated in the UE.

Figure 9:
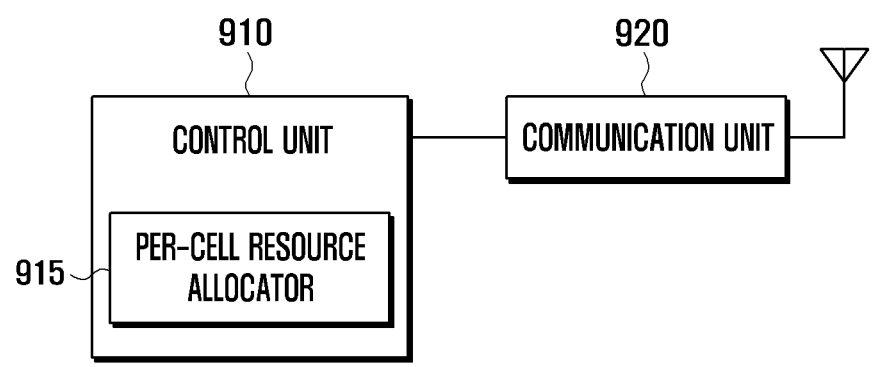
FIG. 9 is a schematic block diagram illustrating a central controller according to an embodiment of the present invention.

FIG. 9 is a schematic block diagram illustrating a central controller according to an embodiment of the present invention.

As shown in FIG. 9, the central controller includes a control unit 910 and a communication unit 920.

The control unit 910 controls configurations and operations of the internal components of the central controller. The control unit 910 notifies the UE of a blanking set of cells that turn off to mute data transmission at a predetermined time and cause potential interference to other cells in the DB mode. The control unit 910 allocates CSI-RS resources per cell for channel estimation of the CoMP UE and notifies the UE of the position of the resource. In order to accomplish this, the control unit 910 includes a per-cell resource allocator 915.

The per-cell resource allocator 915 allocates CSI-RS resources in order for the UE receiving CoMP transmission to estimate the channels of the respective cells and transmit CSI-RSs on the corresponding resources. The resource is allocated for CSI-RS. A set of cells having at least one CSI-RS for channel estimation of the CoMP UE is referred to as measurement set.

The communication unit 920 is responsible for data communication with a UE or a cell, which is controlled by the central controller. The communication unit 920 transmits the CSI-RS on the allocated resource and receives feedback of channel information from the UE under the control of the control unit 910.

As described above, the feedback method and apparatus of the present invention is capable of performing CoMP transmission to the UE located at the cell edge in a cellular mobile communication system.

Also, the feedback method and apparatus of the present invention is capable of providing improved mobile communication service through the CoMP transmission as compared to the non-CoMP transmission.

Also, the feedback method and apparatus of the present invention enables a UE to select the cell for receiving data dynamically at the cell edge.

Also, the feedback method and apparatus of the present invention is capable of turning off the cells causing potential interference in order for neighbor cells to cooperate for CoMP transmission to the UE located at the cell edge.

Furthermore, the feedback method and apparatus of the present invention is capable of allocating high data rate to the UEs without regards to their location within the cell, resulting in improved system throughput.

Although certain embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method for transmitting channel information, by a User Equipment (UE), comprising:
    identifying information for at least one first type Channel Status Information Reference Signal (CSI-RS) and information for at least one second type CSI-RS from an eNB;
    generating first channel information based on a first set of a first type CSI-RS and a second type CSI-RS;
    generating second channel information based on a second set of a first type CSI-RS and a second type CSI-RS;
    reporting the first channel information by Physical Uplink Control CHannel (PUCCH)-based periodic channel information feedback; and reporting the second channel information by the PUCCH-based periodic channel information feedback.

2. The method of claim 1, wherein the second type CSI-RS is zero power for interference measurement.

3. The method of claim 1, wherein the first type CSI-RS is for channel measurement.

4. The method of claim 1, wherein the at least one first type CSI-RS is transmitted on allocated resources.

5. The method of claim 1, wherein the PUCCH-based periodic channel information feedback is predefined for the first set of a first type CSI-RS and a second type CSI-RS, and for the second set of a first type CSI-RS and a second type CSI-RS respectively.

6. A method for receiving channel information, by a eNB, comprising:
   transmitting information for at least one first type Channel Status Information Reference Signal (CSI-RS) and information for at least one second type CSI-RS to a User Equipment (UE);
   receiving first channel information by Physical Uplink Control CHannel (PUCCH)-based periodic channel information feedback; and
   receiving second channel information by the PUCCH-based periodic channel information feedback,
   wherein the first channel information is generated based on a first set of a first type CSI-RS and a second type CSI-RS, and
   wherein the second channel information is generated based on a second set of a first type CSI-RS and a second type CSI-RS.

7. The method of claim 6, wherein the second type CSI-RS is zero power for interference measurement.

8. The method of claim 6, wherein the first type CSI-RS is for channel measurement.

9. The method of claim 6, wherein the at least one first type CSI-RS is received on allocated resources.

10. The method of claim 6, wherein the PUCCH-based periodic channel information feedback is predefined for the first set of a first type CSI-RS and a second type CSI-RS, and for the second set of a first type CSI-RS and a second type CSI-RS respectively.

11. A user equipment for transmitting channel information, comprising:
   a communication unit configured to transmit and receive signals; and
   a control unit configured to control:
      identifying information for at least one first type Channel Status Information Reference Signal (CSI-RS) and information for at least one second type CSI-RS from an eNB;
      generating first channel information based on a first set of a first type CSI-RS and a second type CSI-RS;
      generating second channel information based on a second set of a first type CSI-RS and a second type CSI-RS;
      reporting the first channel information by Physical Uplink Control CHannel (PUCCH)-based periodic channel information feedback; and
      reporting the second channel information by the PUCCH-based periodic channel information feedback.

12. The user equipment of claim 11, wherein the second type CSI-RS is zero power for interference measurement.

13. The user equipment of claim 11, wherein the first type CSI-RS is for channel measurement.

14. The user equipment of claim 11, wherein the control unit is further configured to control transmitting the at least one first type CSI-RS on allocated resources.

15. The user equipment of claim 11, wherein the PUCCH-based periodic channel information feedback is predefined for the first set of a first type CSI-RS and a second type CSI-RS, and for the second set of a first type CSI-RS and a second type CSI-RS respectively.

16. An eNB for receiving channel information, comprising:
   a communication unit configured to transmit and receive signals; and
   a control unit configured to control:
      transmitting information for at least one first type Channel Status Information Reference Signal (CSI-RS) and information for at least one second type CSI-RS to a User Equipment (UE);
      receiving first channel information by Physical Uplink Control CHannel (PUCCH)-based periodic channel information feedback; and
      receiving second channel information by the PUCCH-based periodic channel information feedback,
   wherein the first channel information is generated based on a first set of a first type CSI-RS and a second type CSI-RS, and
   wherein the second channel information is generated based on a second set of a first type CSI-RS and a second type CSI-RS.

17. The eNB of claim 16, wherein the second type CSI-RS is zero power for interference measurement.

18. The eNB of claim 16, wherein the first type CSI-RS is for channel measurement.

19. The eNB of claim 16, wherein the communication unit is configured to receive the at least one first type CSI-RS on allocated resources.

20. The eNB of claim 16, wherein the PUCCH-based periodic channel information feedback is predefined for the first set of a first type CSI-RS and a second type CSI-RS, and for the second set of a first type CSI-RS and a second type CSI-RS respectively.

* * * * *